United States Patent

[11] 3,588,631

[72] Inventors David S. Miller
 Severna Park, Md.;
 Elmo James Fresia, Williamstown; Alan G. Cooper, North Adams, Mass.
[21] Appl. No. 877,344
[22] Filed Nov. 17, 1969
[45] Patented June 28, 1971
[73] Assignee Sprague Electric Company
 North Adams, Mass.
 Continuation-in-part of application Ser. No. 826,342, May 21, 1969.

[54] NONPOLAR FEED-THROUGH CAPACITOR
 6 Claims, 1 Drawing Fig.
[52] U.S. Cl. .................................................. 317/230,
 317/242, 317/233
[51] Int. Cl. ...................................................... H01g 9/08,
 H01g 9/14
[50] Field of Search............................................ 317/230,
 231, 232, 233

[56] References Cited
 UNITED STATES PATENTS

| | | | |
|---|---|---|---|
| 3,115,596 | 12/1963 | Fritoch.......................... | 317/230 |
| 3,255,386 | 6/1966 | Millard et al. ................ | 317/230 |
| 3,491,270 | 1/1970 | Gabriel et al. ................ | 317/230 |

Primary Examiner—James D. Kallam
Attorneys—Connolly and Hutz, Vincent H. Sweeney, James Paul O'Sullivan and David R. Thornton ABSTRACT: A nonpolar feed-through solid electrolyte capacitor is provided by forming a feed-through solid electrolyte capacitor within the aperture of another solid electrolyte capacitor of tubular configuration, electrically connecting their respective cathodes and connecting the anode of the outer capacitor to a casing. The capacitor assembly offers a low line-to-ground impedance path for high frequency signals and noise and a low frequency low impedance path through the feed-through capacitor. The low line-to-ground impedance path for high frequency signals is improved by the addition of circular feed-through ceramic capacitors at each terminal. The feed-through ceramic capacitors provide improved frequency response together with hermetic end sealing of the case.

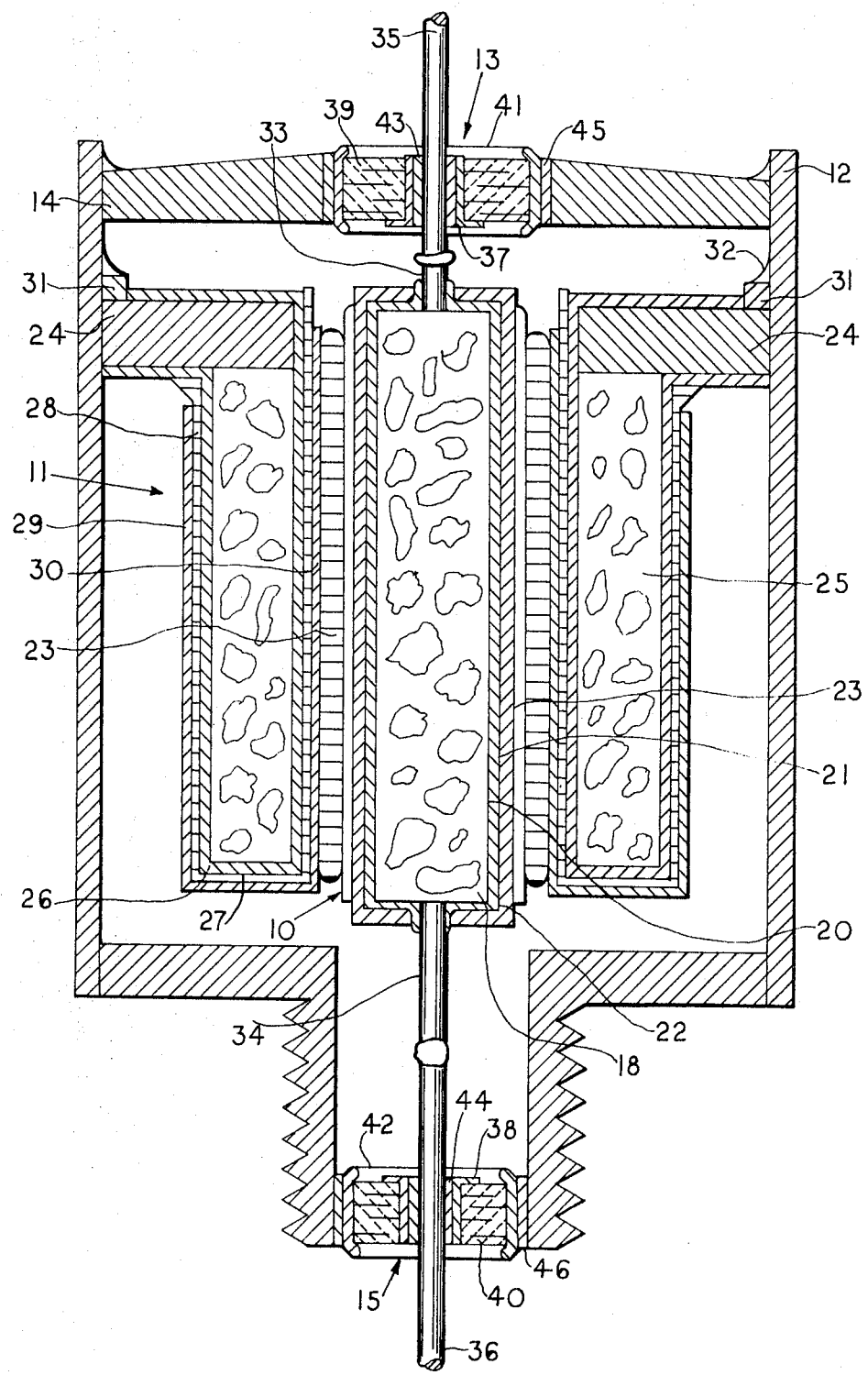

NONPOLAR FEED-THROUGH CAPACITOR

CROSS REFERENCES TO RELATED APPLICATIONS

The present invention is a continuation-in-part of copending application Ser. No. 826,342 filed in the names of David S. Miller, E. James Fresia and Alan S. Cooper on May 21, 1969.

BACKGROUND OF THE INVENTION

This invention relates to a nonpolar feed-through capacitor, and more particularly to a solid electrolyte nonpolar feed-through capacitor which is hermetically sealed at each end of its case by a circular feed-through ceramic capacitor which provides an additional low line-to-ground impedance path for high frequency signals.

It has become well known in the communications and related electronic arts to utilize polar feed-through capacitors to suppress undesirable high frequency signals and/or noise. The interference signals or noise are bypassed to ground through the capacitor dielectric and the main signal is transmitted through the conducting portion of the capacitor. There are however, many circuit applications where reversals of polarity in the circuit may harm a polarized capacitor.

It is therefore the principal object of this invention to provide a nonpolar device capable of passing low frequency signals and rejecting undesirable high frequency signals and/or noise.

It is a further object of this invention to provide a nonpolar feed-through capacitor in which the rejection of undesirable high frequency signals is improved.

It is a further object to provide such a device having a minimum series inductance and maximum high frequency shielding.

SUMMARY OF THE INVENTION

Broadly, this invention relates to a nonpolar high frequency/noise filter device. More particularly, the invention relates to a nonpolar feed-through capacitor comprising two polar solid tantalum pellet capacitors, the first having a tubular configuration and the second having a cylindrical construction and designed to be accommodated within the cavity of the tubular capacitor. The cathodes of the two capacitors are electrically connected and a grounding connection is made to a metal casing by means of a grounding ring attached to the anode of the tubular capacitor. A feed-through connection may be established either by using a feed-through lead through the second capacitor or by inserting the lead ends into the body of the second capacitor and using the anode as the conductor. The leads are hermetically sealed to the metal casing by circular ceramic feed-through capacitors which have excellent low line-to-ground impedance characteristics for high frequency signals. The capacitors are connected to the leads and to the case by uninterrupted rings of solder which provide noninductive connections thereby improving the frequency response and roll off characteristics associated with the system.

BRIEF DESCRIPTION OF THE DRAWING

FIG. 1 is a sectional view of a feed-through capacitor according to the present invention.

DETAILED DESCRIPTION OF THE PRESENT INVENTION

In FIG. 1, an example of a nonpolar feed-through capacitor is presented. Capacitors 10 and 11 are mounted within a casing 12. One end of the casing 12, which may be of copper or brass construction, is hermetically sealed by means of circular feed-through ceramic capacitor 13 including metallic ring 14 which is soldered to the casing. The other (threaded) end of casing 12 is sealed by circular feed-through ceramic capacitor 15. Capacitor 10 is a solid electrolyte section of the type described in detail in U.S. Pat. No. 2,936,514 issued to R. J. Millard on May 17, 1960. For purposes of this description, capacitor 10 comprises an anode 18 of sintered tantalum which is provided with a dielectric layer 20 of tantalum oxide. A solid electrolyte 21, e.g., manganese dioxide, is thereafter applied and a carbon layer 22 is coated onto the electrolyte surface. A silver (or other solderable metal) layer 23 is provided over the carbon layer 22.

Capacitor 11 is prepared in a manner similar to capacitor 10 excepting that, after a preliminary sintering of the tantalum anode, a tantalum grounding ring 24 is welded in place on the top surface of anode 25. The ring may be resistance welded and the pellet again sintered to remove contamination due to the welding and to establish a stronger bond between anode and ring. The tantalum anode-ring assembly is anodized to form oxide layer 26. Arranged on layer 26 is a solid electrolyte layer 27, carbon layer 28 and silver layer 29 all of which are masked from the exposed surface of ring 24. The cathodes of capacitors 10 and 11 are electrically connected by means of solder strip 30. This solder forms an intimate, continuous, noninductive bond between the two capacitors and, since it runs along the entire inner lateral surface of capacitor 11, is especially effective in providing an R.F. shield between the feed-through terminals of the capacitor, preventing any undesirable transmission of R.F. energy from either direction.

Grounding ring 24 is assembly fitted to abut the wall of housing 12. Since tantalum is not solderable, a solderable metallic ring 31, i.e., nickel, is welded to the tantalum ring 24, the ring 31 in turn being connected to the casing wall by means of a continuous solder ring 32. This ring 32, like the solder ring 30 between the capacitors, provides an effective shielding against R.F. seepage along edges of the grounding ring.

Risers 33 and 34, form the lead-in connections to capacitor 10. Tinned leads 35 and 36 are welded to risers 33 and 34 respectively.

In the preferred embodiment the sealing capacitors 13 and 15 are formed from one or more monolithic feed-through chips whereby a plurality of plane parallel electrodes of silver or the like are integrally disposed within a ceramic dielectric such as barium titanate or the like, with alternate electrodes extending to the inner and outer diameters of the chip, respectively. Each chip is constructed in a conventional manner such as by building up a plurality of thin coatings by such means as spraying or the like. The chips are then cut on the inner and outer diameter to form ceramic rings 39 and 40. In an alternate embodiment the ceramic feed-through capacitor would comprise a solid ceramic chip having no parallel electrodes disposed within it. The electrodes would be formed by conductive coatings on the inner and outer diameters of the feed-through chip.

In the preferred embodiment the inner and outer edges of ceramic rings 39 and 40 are coated with a conductive material such as silver paint in order to electrically connect each set of electrodes extending to the inner and outer diameters of the chip respectively. The conductive coatings on the inner edges of ceramic rings 39 and 40 are then soldered to eyelets 37 and 38 respectively by a silver bearing solder or the like.

The conductive coatings on the outer edges of ceramic rings 39 and 40 are soldered to the cups 41 and 42 respectively. The inner eyelets 37 and 38 may be composed of brass. Cups 41 and 42 should be of a material whose coefficient of expansion is close to that of the ceramic, as for example soft ingot iron or the like, so as to avoid stress of the capacitor chips and their connection to cups 41 and 42.

Tinned leads 35 and 36 pass through eyelets 37 and 38 and are soldered to each eyelet respectively, forming solder rings 43 and 44 which provide uninterrupted radial connections between the leads and their eyelets thereby making the connection between lead and eyelet noninductive. The periphery of cup 41 is soldered to the inner diameter of metallic ring 14 as shown at 45. This connection is also made noninductive by providing a complete uninterrupted solder connection between the cup and the inner wall of ring 14. Also the periphery of cup 42 is uninterruptedly soldered to the inner wall of the threaded end of casing 12 as shown at 46.

The uninterrupted radial connections on the inner and outer diameter of the ceramic feed-through capacitors provide an excellent hermetic seal. The feed-through capacitors themselves provide an improved low line-to-ground impedance path for high frequency noise signals thereby improving the rolloff characteristics associated with the tantalum system. The noninductive capacitor construction provides exceptionally low R.F. impedance from line to case and the uninterrupted solder joints also provide excellent R.F. shielding.

We claim:

1. A nonpolar feed-through noise filter comprising a first solid electrolyte capacitor of tubular configuration; a second feed-through solid electrolyte capacitor within the aperture of said first capacitor with its cathode electrically connected to the cathode of said first capacitor; a sealed hollow casing enclosing said capacitors with the terminals of said second capacitor extending through openings in said casing; connecting means for electrically connecting the anode of said first capacitor to said casing; and a first circular feed-through ceramic capacitor hermetically sealing an end of said casing and which is uninterruptedly soldered on its inner diameter to said terminal and on its outer diameter to said casing thereby providing low R.F. impedance from terminal to case together with R.F. shielding.

2. The filter of claim 1 wherein a second circular feed-through ceramic capacitor hermetically seals another end of said casing.

3. The filter of claim 2 wherein said first and said second circular feed-through ceramic capacitors comprise a circular monolithic feed-through ceramic ring, a plurality of plane parallel electrodes of conducting films integrally disposed within said ceramic dielectric ring with alternate electrodes extending to the inner and outer diameters of said ring respectively, a conductive coating, respectively, on the inner and outer edge of said ceramic ring electrically connecting each respective set of electrodes, a conductive eyelet soldered to said inner conductive coating and a conductive ring soldered to said outer conductive coating.

4. The filter of claim 3 wherein said first solid electrolyte capacitor comprises a first porous electrode section of sintered anodizable metal having a dielectric film on its surface; said second electrolyte capacitor comprises a second porous electrode section of sintered anodizable metal having a dielectric film on its surface together with lead-in anode connections projecting therefrom; said cathodes of said first and second capacitors respectively connected to a solid electrolyte layer overlying the respective dielectric films of said first and second sections and said cathodes forming a common connection between said sections along the surface of said second section and abutting portion of said first section; said first capacitor section having means, including a grounding ring, connecting the section to said casing, and said ring being in connection with the anode of said first section; and in circumferential noninductive connection with the wall of said casing.

5. The filter of claim 4 wherein said first and second electrode sections have a conductive film overlying said electrolyte layer and the common connection between said sections is effected by means of a continuous 360° solder flow intermediate abutting conductive films.

6. The filter of claim 4 wherein the sintered metal of said first and second sections is tantalum, and the grounding ring of said first section is tantalum connected to said casing walls by means of a solderable metal.